United States Patent
Xu

(10) Patent No.: US 9,909,673 B2
(45) Date of Patent: Mar. 6, 2018

(54) GAS TURBINE ENGINE FLUID SUPPLY SYSTEM HAVING AT LEAST ONE AIRBAG, AND METHOD FOR MAINTAINING NON-INTERRUPTED CIRCULATING TURBOMACHINE FLUID FLOW DURING A NON-POSITIVE G-FORCE EVENT

(71) Applicant: United Technologies Corporation, Hartford, CT (US)

(72) Inventor: JinQuan Xu, East Greenwich, RI (US)

(73) Assignee: United Technologies Corporation, Farmington, CT (US)

( * ) Notice: Subject to any disclaimer, the term of this patent is extended or adjusted under 35 U.S.C. 154(b) by 443 days.

(21) Appl. No.: 14/724,413

(22) Filed: May 28, 2015

(65) Prior Publication Data

US 2015/0345656 A1    Dec. 3, 2015

Related U.S. Application Data

(60) Provisional application No. 62/005,513, filed on May 30, 2014.

(51) Int. Cl.

| F01D 25/20 | (2006.01) |
|---|---|
| F16K 7/18 | (2006.01) |
| F16K 15/16 | (2006.01) |
| F02K 3/06 | (2006.01) |
| F16N 19/00 | (2006.01) |

(52) U.S. Cl.
CPC ............. F16K 7/18 (2013.01); F01D 25/20 (2013.01); F02K 3/06 (2013.01); F16K 15/16 (2013.01); F16N 19/00 (2013.01); *F05D 2260/4031* (2013.01)

(58) Field of Classification Search
CPC . F16K 7/81; F16K 15/16; F01D 25/20; F02K 3/06; F16N 19/00; F05D 2260/4031
See application file for complete search history.

(56) References Cited

U.S. PATENT DOCUMENTS

| 7,174,997 B2 | 2/2007 | Sheridan |
|---|---|---|
| 7,387,189 B2 | 6/2008 | James et al. |
| 7,775,460 B2 | 8/2010 | Berg et al. |
| 8,205,427 B2 | 6/2012 | Schwarz et al. |
| 8,215,454 B2 | 7/2012 | Portlock et al. |
| 8,348,017 B2 | 1/2013 | Dickie et al. |
| 8,651,240 B1 | 2/2014 | Motto |

(Continued)

*Primary Examiner* — Richard Edgar
(74) *Attorney, Agent, or Firm* — O'Shea Getz P.C.

(57) ABSTRACT

A fluid supply system for providing a turbomachine fluid to a component of a gas turbine engine is disclosed. The fluid supply system includes a fluid container, a moveable barrier, and an airbag. The moveable barrier fluidly divides the fluid container into a first portion and a second portion. The moveable barrier is moveable between a flow-permitting position and a flow-restricting position. The turbomachine fluid experiences a circulating flow between the component and the second portion of fluid container when the moveable barrier is in the flow-permitting position. The circulating flow is at least partially impeded by the moveable barrier when the moveable barrier is in the flow-restricting position. The airbag is positioned within the first portion of the fluid container. The airbag is selectively operable to move the moveable barrier from the flow-permitting position to the flow-restricting position.

20 Claims, 4 Drawing Sheets

(56) References Cited

U.S. PATENT DOCUMENTS

| | | |
|---|---|---|
| 8,776,952 B2 | 7/2014 | Schwarz et al. |
| 8,800,720 B2 | 8/2014 | Motto |
| 8,978,829 B2 | 3/2015 | McCune et al. |
| 8,985,278 B2 | 3/2015 | Xu |
| 9,127,567 B2 | 9/2015 | Motto |
| 2014/0003906 A1* | 1/2014 | Motto ............... F01D 25/18 415/1 |

* cited by examiner

GAS TURBINE ENGINE FLUID SUPPLY SYSTEM HAVING AT LEAST ONE AIRBAG, AND METHOD FOR MAINTAINING NON-INTERRUPTED CIRCULATING TURBOMACHINE FLUID FLOW DURING A NON-POSITIVE G-FORCE EVENT

This application claims priority to U.S. Patent Appln. No. 62/005,513 filed May 30, 2014.

BACKGROUND

1. Technical Field

Aspects of the present invention relate to a gas turbine engine fluid supply system, and more particularly relate to a gas turbine engine fluid supply system that includes at least one airbag, and a method for maintaining a non-interrupted circulating turbomachine fluid flow to a component of a gas turbine engine during a non-positive g-force event.

2. Background Information

A gas turbine engine can be used to propel an aircraft in flight. The g-forces acting on the gas turbine engine typically are positive when the aircraft is in flight; however, in some instances, the g-forces can be zero or negative when the aircraft is in flight. This can be problematic in that zero or negative g-forces can interrupt the supply of a turbomachine fluid (e.g., a lubricant such as oil) to one or more components of the gas turbine engine that require a non-interrupted supply of the turbomachine fluid during operation of the gas turbine engine. Aspects of the present invention are directed to this and other problems.

SUMMARY OF ASPECTS OF THE INVENTION

According to an aspect of the present invention, a fluid supply system for providing a turbomachine fluid to a component of a gas turbine engine is provided. The fluid supply system includes a fluid container, a moveable barrier, and an airbag. The moveable barrier fluidly divides the fluid container into a first portion and a second portion. The moveable barrier is moveable between a flow-permitting position and a flow-restricting position. The turbomachine fluid experiences a circulating flow between the component and the second portion of the fluid container when the moveable barrier is in the flow-permitting position. The circulating flow is at least partially impeded by the moveable barrier when the moveable barrier is in the flow-restricting position. The airbag is positioned within the first portion of the fluid container. The airbag is selectively operable to move the moveable barrier from the flow-permitting position to the flow-restricting position.

According to another aspect of the present invention, a method of maintaining a non-interrupted circulating flow of a turbomachine fluid to a component of a gas turbine engine during a non-positive g-force event is provided. The method includes the steps of: (1) providing a fluid supply system that includes a fluid container, a moveable barrier fluidly dividing the fluid container into a first portion and a second portion, and an airbag positioned within the first portion of the fluid container; (2) providing a circulating flow of the turbomachine fluid between the component of the gas turbine engine and the second portion of the fluid container; and (3) selectively inflating the airbag to move the moveable barrier from a flow-permitting position to a flow-restricting position during the non-positive g-force event, wherein the circulating flow of the turbomachine fluid is at least partially impeded by the moveable barrier when the moveable barrier is in the flow-restricting position.

In addition to, or as an alternative to, one or more of the features described above, further aspects of the present invention can include one or more of the following features, individually or in combination:

the turbomachine fluid is a lubricant;

the component is at least a portion of a geared architecture of the gas turbine engine;

the circulating flow is stopped by the moveable barrier when the moveable barrier is in the flow-restricting position;

the moveable barrier is a piston-type barrier that includes a spring biases the moveable barrier toward the flow-permitting position;

movement of the moveable barrier from the flow-permitting position to the flow-restricting position during a non-positive g-force event, and thereby aids in maintaining a non-interrupted supply of the turbomachine fluid to the component;

the fluid supply system further includes a pump operable to draw the turbomachine fluid from an outlet disposed relative to the second portion of the fluid container, and operable to deliver the turbomachine fluid to the component of the gas turbine engine; and movement of the moveable barrier from the flow-permitting position to the flow-restricting position allows the pump to maintain positive suction at the outlet;

the airbag is selectively inflatable;

the airbag includes a bag portion, an inflation material disposed within the bag portion, and an initiator portion disposed relative to the inflation material; and upon initiation by the initiator portion of the airbag, the inflation material rapidly generates a sufficient amount of gas to actuate the airbag from a deflated state to an inflated state;

the initiation includes catalysis of a chemical reaction involving the inflation material;

the airbag includes a bag portion, an inflation material disposed within the bag portion, and an initiator portion disposed relative to the inflation material;

the airbag is selectively actuatable from a deflated state to an inflated state; in the deflated state, a volume of the bag portion is smaller than a volume of the first portion of the fluid container when the moveable barrier is in the flow-permitting position; in the inflated state, a volume of the bag portion is greater than a volume of the first portion of the fluid container when the moveable barrier is in the flow-permitting position;

when the airbag is selectively actuated from the deflated state to the inflated state, the bag portion imparts forces on the inner surface of the fluid container and the moveable barrier that cause the moveable barrier to move from the flow-permitting position to the flow-restricting position;

the initiator portion of the airbag is a pyrotechnic device that is operable to initiate the inflation material included in the airbag;

the initiator portion of the airbag is operable to initiate the inflation material included in the airbag in response to a control signal received from an airbag controller;

the airbag controller is operable to detect and process information indicative of g-forces experienced by the gas turbine engine, and operable to make a determination as to whether the airbag should be inflated;

the airbag is configured for one time use;

the airbag is a first airbag; and the fluid supply system further comprises a second airbag positioned within the first portion of the fluid container, and the second airbag is selectively operable to move the moveable barrier from the flow-permitting position to the flow-restricting position; and the fluid supply system further comprises an airbag controller that is operable to independently and selectively inflate each of the first airbag and the second airbag.

These and other aspects of the present invention will become apparent in light of the drawings and detailed description provided below.

DETAILED DESCRIPTION OF ASPECTS OF THE INVENTION

Figure 1:
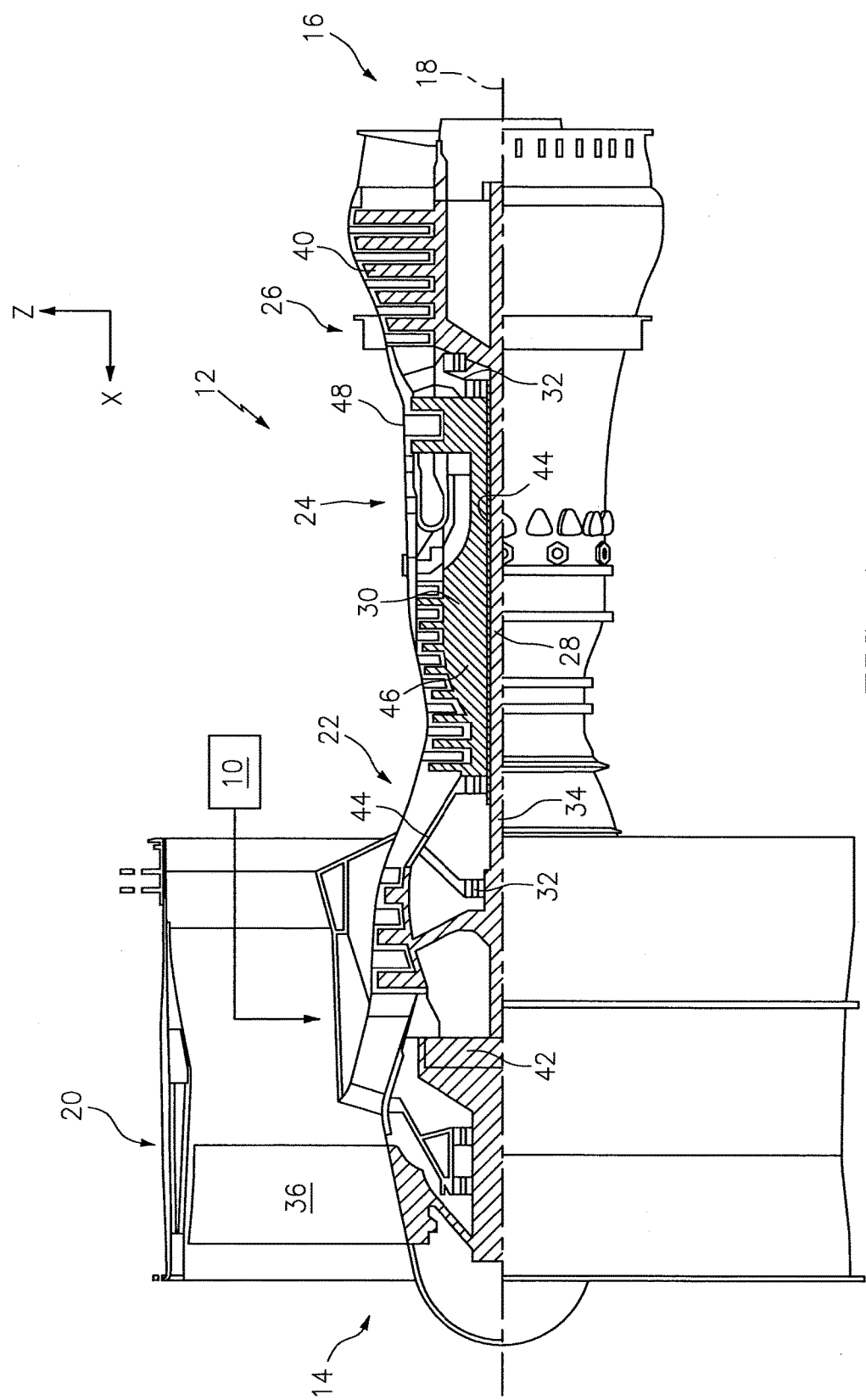
FIG. 1 illustrates a schematic view of a gas turbine engine that includes an embodiment of the present fluid supply system.

Referring to FIGS. 1-4, the present disclosure describes embodiments of a fluid supply system 10 for use in a gas turbine engine 12 (see FIG. 1), and embodiments of a method for maintaining a non-interrupted circulating flow of a turbomachine fluid to a component of the gas turbine engine 12 during a non-positive g-force event.

The present disclosure describes aspects of the present invention with reference to the exemplary embodiments illustrated in the drawings; however, aspects of the present invention are not limited to the exemplary embodiments illustrated in the drawings. The present disclosure may describe one or more features as having a length extending relative to an x-axis, a width extending relative to a y-axis, and/or a height extending relative to a z-axis. The drawings illustrate the respective axes.

Referring to FIG. 1, in the illustrated embodiments the fluid supply system 10 is included in a two-spool, turbofan-type gas turbine engine 12. In other embodiments not shown in the drawings, the fluid supply system 10 can alternatively be used with various other types of gas turbine engines (e.g., three-spool gas turbine engines, augmented gas turbine engines, direct drive turbofan gas turbine engines, turbojet gas turbine engines, turbo-shaft gas turbine engines, multi-stream variable cycle gas turbine engines, automotive gas turbine engines, etc.).

In the illustrated embodiments, the gas turbine engine 12 extends in a lengthwise direction between a forward end 14 and an aft end 16, and the gas turbine engine 12 extends circumferentially about a lengthwise-extending centerline 18. The term "circumferential," and/or variations thereof, are used herein to indicate that a feature extends along a curve that is centered about an axis. In addition to the fluid supply system 10, which will be discussed in detail below, the illustrated gas turbine engine 12 includes a fan section 20, a compressor section 22, a combustor section 24, a turbine section 26, a low-speed spool 28, and a high-speed spool 30. The low-speed spool 28 and the high-speed spool 30 are rotatably supported by several bearing systems 32. The low-speed spool 28 includes a first shaft 34 that interconnects: (i) a fan 36 in the fan section 20; (ii) a low-pressure compressor 38 of the compressor section 22; and (iii) a low-pressure turbine 40 of the turbine section 26. The first shaft 34 is connected to the fan 36 through a geared architecture 42 (e.g., an epicyclic gear train including a planetary gear system) to drive the fan 36 at a speed lower than that of the low-speed spool 28. The high-speed spool 30 includes a second shaft 44 that interconnects: (i) a high-pressure compressor 46 of the compressor section 22; and (ii) a high-pressure turbine 48 of the turbine section 26. The first shaft 34 and the second shaft 44 are concentric and rotate via the bearing systems 32 about the centerline 18 of the gas turbine engine 12, which is collinear with the axes of the first shaft 34 and the second shaft 44.

During operation of the illustrated gas turbine engine 12, an airstream (not shown) enters the gas turbine engine 12 through the fan section 20, and the airstream is thereafter divided into a core airstream (not shown) and a bypass airstream (not shown). The core airstream is compressed in the compressor section 22, heated in the combustor section 24, and expanded to produce rotational power in the turbine section 26. The bypass airstream passes through a bypass duct (not shown). The core airstream and the bypass airstream are discharged through the aft end 16 of the gas turbine engine 12 to provide forward thrust. The amount of forward thrust provided depends at least in part on one or more characteristics of the gas turbine engine (e.g., a fan pressure ratio of the fan section 20, a pressure ratio within the turbine section 26, a bypass ratio, a gear reduction ratio of the geared architecture 42, etc.).

Figure 2:
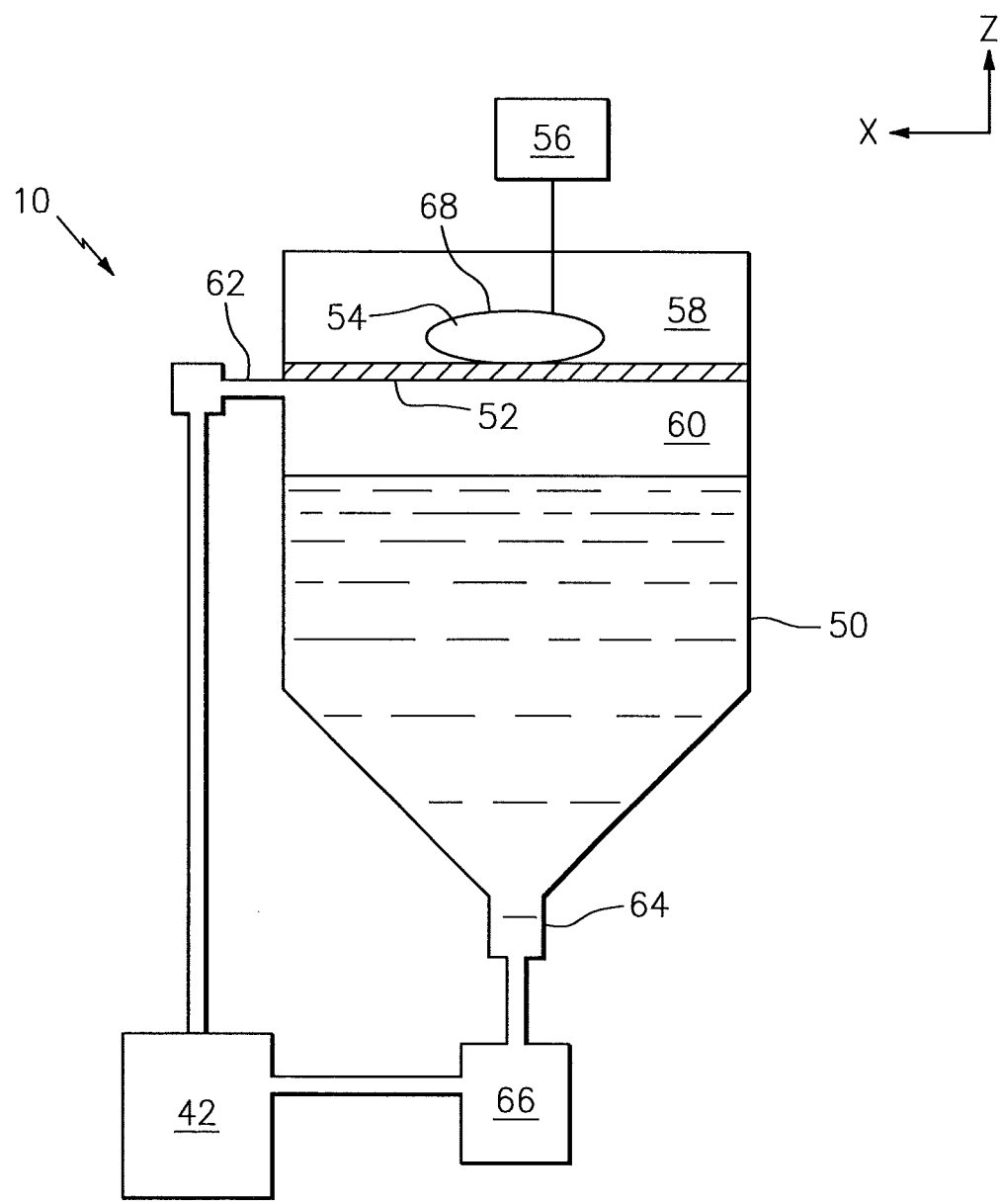
FIG. 2 illustrates a schematic view of the fluid supply system of FIG. 1, with the airbag of the fluid supply system being shown in a deflated state.
Figure 3:
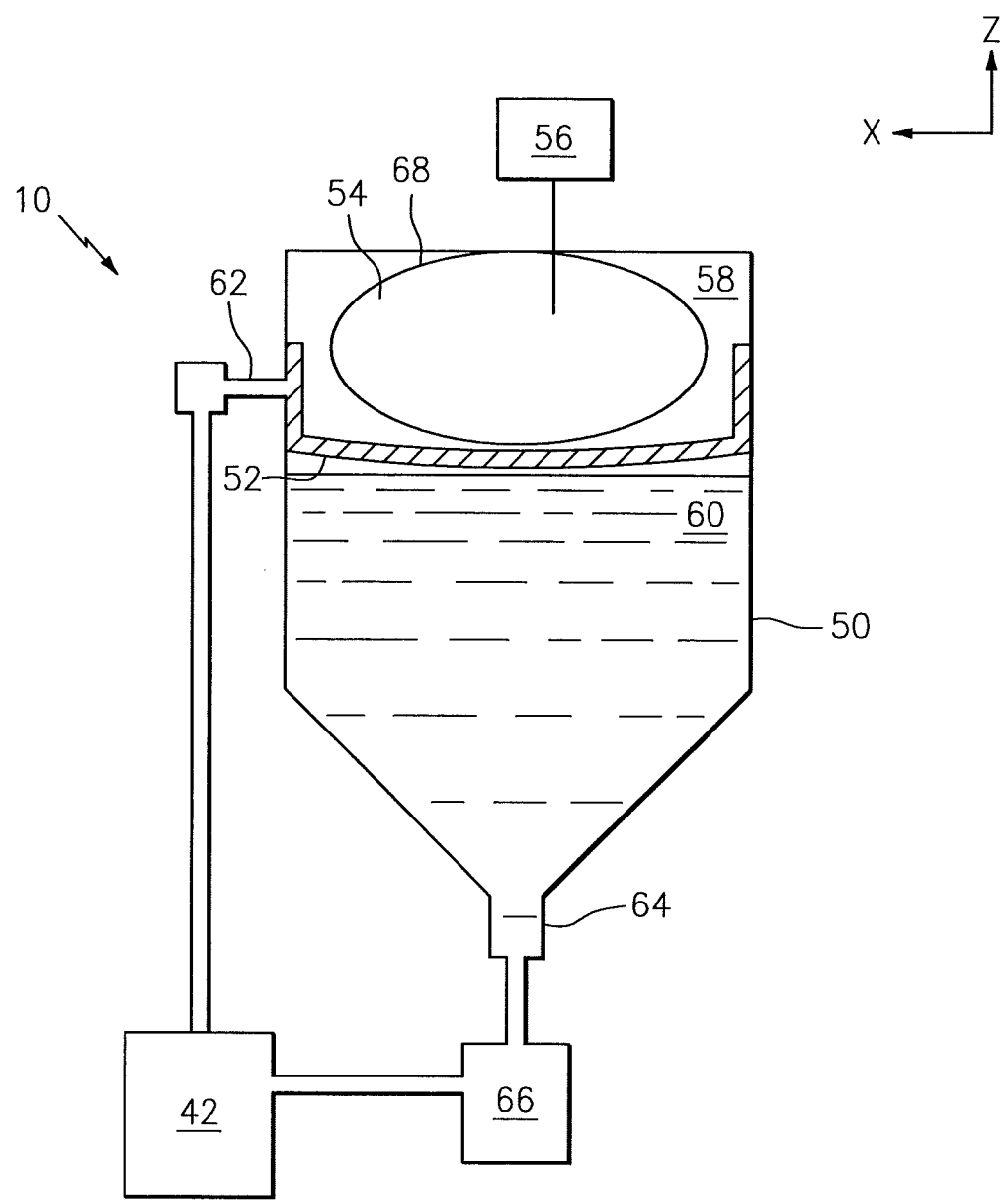
FIG. 3 illustrates a schematic view of the fluid supply system of FIG. 1, with the airbag of the fluid supply system being shown in an inflated state.
Figure 4:
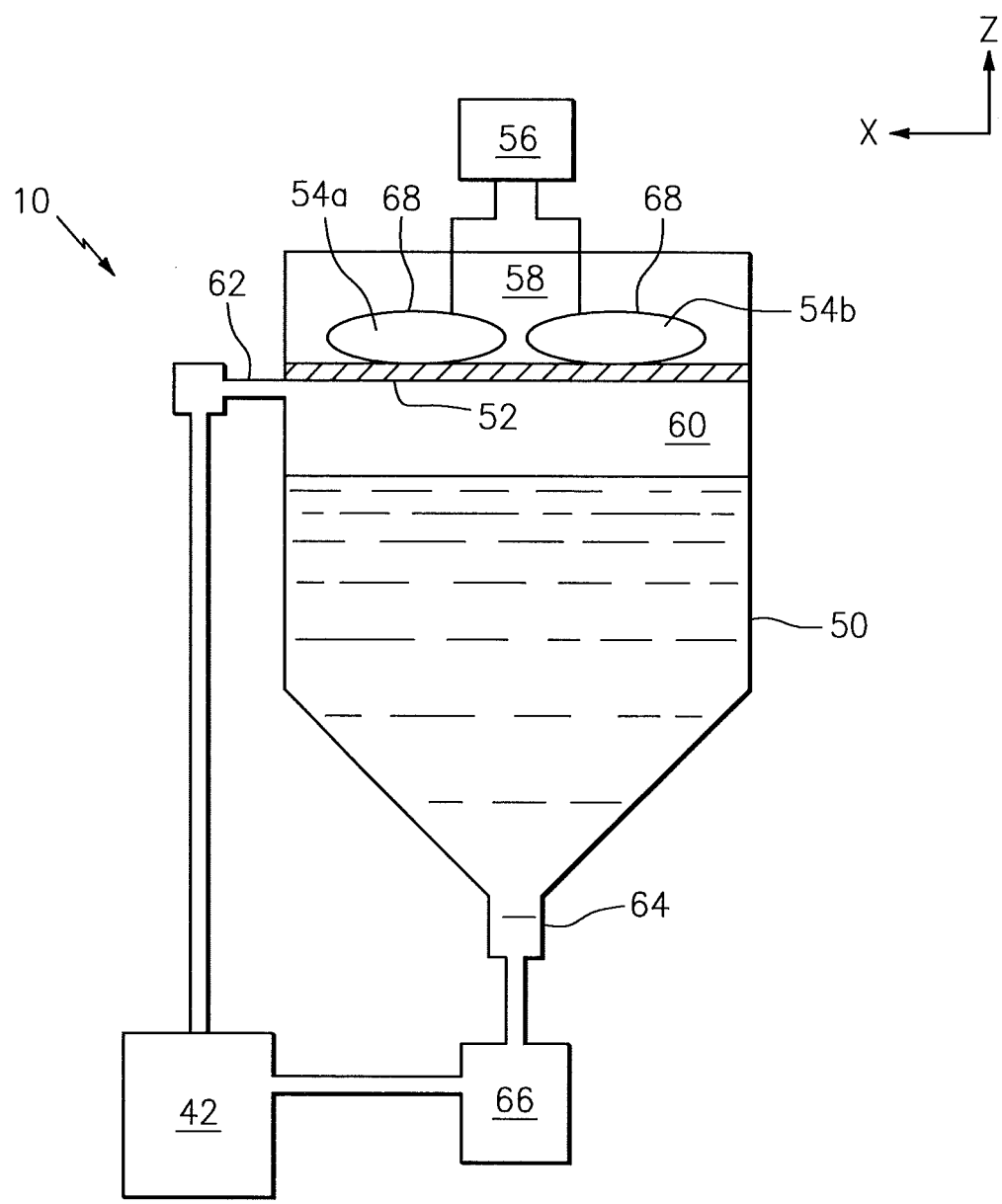
FIG. 4 illustrates a schematic view of another embodiment of the present fluid supply system.

Referring to FIGS. 2-4, the fluid supply system 10 provides a turbomachine fluid (e.g., a lubricant such as oil) to at least one component (e.g., the geared architecture 42) of the gas turbine engine 12. The fluid supply system 10 includes a fluid container 50, a moveable barrier 52, at least one airbag 54, and an airbag controller 56. The moveable barrier 52 and the airbag 54 are disposed within the fluid container 50. The moveable barrier 52 fluidly divides the fluid container 50 into a first portion 58 and a second portion 60. The airbag 54 is positioned within the first portion 58 of the fluid container 50, and the turbomachine fluid is selectively delivered to the second portion 60 of the fluid container 50, as will be discussed further below.

The moveable barrier 52 is moveable between a flow-permitting position (see FIGS. 2 and 4) and a flow-restricting position (see FIG. 3). In the illustrated embodiments, when the moveable barrier 52 is in the flow-permitting position (see FIGS. 2 and 4), the turbomachine fluid can flow into the second portion 60 of the fluid container 50 via an inlet 62, and the turbomachine fluid can then flow out of the second portion 60 of the fluid container 50 to the geared architecture 42 via outlet 64. The turbomachine fluid thus circulatingly flows between the geared architecture 42 and the second portion 60 of the fluid container 50. The fluid supply system 10 further includes a pump 66 that draws the turbomachine fluid from the second portion 60 of the fluid container 50, and delivers the turbomachine fluid to the geared architecture 42. When the moveable barrier 52 is in the flow-restricting position (see FIG. 3), the flow of the turbomachine fluid through the inlet 62 is at least partially impeded (e.g., slowed, stopped) by the moveable barrier 52, and thus the circulating flow of the turbomachine fluid between the geared architecture 42 and the second portion 60 of the fluid container 50 is at least partially impeded by the moveable barrier 52. That is, for example, a lower volume of the turbomachine fluid can flow into the second portion 60 of the fluid container 50 via the inlet 62 when the moveable barrier 52 is in the flow-restricting position (see FIG. 3) than when the moveable barrier 52 is in the flow-permitting position (see FIGS. 2 and 4). In some embodiments not shown in the drawings, the moveable barrier 52 completely blocks flow of the turbomachine fluid into the second portion 60 of the fluid container 50 via the inlet 62 when the moveable barrier 52 is in the flow-restricting position (see FIG. 3).

The moveable barrier 52 can be configured in various different ways. In the illustrated embodiment, the moveable barrier 52 is a piston-type barrier that includes a spring (not shown) that is operable to return the moveable barrier 52 from the flow-restricting position (see FIG. 3) to the flow-permitting position (see FIGS. 2 and 4). In some embodiments not shown in the drawings, the moveable barrier 52 can have folds and/or an accordion-like construction.

During operation of the gas turbine engine 12 the moveable barrier 52 can be moved from the flow-permitting position (see FIGS. 2 and 4) to the flow-restricting position (see FIG. 3) by the airbag 54 and the airbag controller 56, as will be described below. Movement of the moveable barrier 52 from the flow-permitting position (see FIGS. 2 and 4) to the flow-restricting position (see FIG. 3) during a non-positive g-force event (i.e., a negative g-force event and/or a zero g-force event) aids in limiting flow of the turbomachine fluid away from the outlet 64 of the fluid container 50. In the illustrated embodiment, this in turn allows the pump 66 to maintain positive suction at the outlet 64, and thereby enables a non-interrupted supply of the turbomachine fluid to the at least one component (e.g., the geared architecture 42) of the gas turbine engine 12 for at least a portion of the non-positive g-force event.

The airbag 54 includes a bag portion 68, at least one inflation material (not shown) disposed within the bag portion 68, and an initiator portion (not shown) disposed relative to the inflation material.

The airbag 54 is selectively inflatable. That is, the airbag 54 can be selectively actuated from a deflated state (see FIGS. 2 and 4) to an inflated state (see FIG. 3). In the deflated state (see FIGS. 2 and 4), the volume of the bag portion 68 is smaller (e.g., substantially smaller) than the volume of the first portion 58 of the fluid container 50 when the moveable barrier 52 is in the flow-permitting position (see FIGS. 2 and 4). In the inflated state (see FIG. 3), the volume of the bag portion 68 is sufficiently great that the bag portion 68 imparts forces on the inner surface of the fluid container 50 and the moveable barrier 52 that cause the moveable barrier 52 to move from the flow-permitting position (see FIGS. 2 and 4) to the flow-restricting position (see FIG. 3).

The bag portion 68 of the airbag 54 includes at least one vent (not shown) through which fluid within the bag portion 68 can gradually discharge after the airbag 54 has been inflated. The size (e.g., volume) of the bag portion 68 can vary depending on the size (e.g., volume) of the fluid container 50, and in particular, the size (e.g., volume) of the first portion 58 of the fluid container 50. The bag portion 68 can be made of one or more materials that are known in the art. The one or more materials can have one or more characteristics (e.g., flexibility, durability, ability to withstand heat, etc.) that permit the bag portion 68 to perform the functionality described herein.

The inflation material included in the airbag 54 is at least one material (e.g., a propellant) that, upon initiation by the initiator portion of the airbag 54 (described below), rapidly generates (e.g., nearly instantaneously generates) a sufficient amount of gas to inflate the airbag 54 as described above. Before the inflation material is initiated, the inflation material can have various different forms (e.g., solid form, liquid form, etc.). The inflation material can be one or more materials that are known in the art.

The initiator portion of the airbag 54 is a pyrotechnic device (e.g., an electric match), or another known device, that is operable to initiate the inflation material included in the airbag 54, as described above. The term "initiate," and/or variations thereof, are used herein to indicate the catalysis of a chemical reaction involving the inflation material that causes the inflation material to rapidly generate a sufficient amount of gas to inflate the airbag 54, as described above. The initiator portion is operable to initiate the inflation material included in the airbag 54 in response to a control signal received from the airbag controller, as will be described below.

The initiator portion of the airbag 54 can be implemented using analog and/or digital hardware (e.g., counters, switches, logic devices, memory devices, programmable processors, non-transitory computer readable storage mediums), software, firmware, or a combination thereof. The initiator portion can perform one or more of the functions described herein by executing software, which can be stored, for example, in a memory device included in the initiator portion. A person having ordinary skill in the art would be able to adapt (e.g., construct, program) the initiator portion to perform the functionality described herein without undue experimentation. Although the initiator portion of the airbag 54 is described herein as being a separate component from the airbag controller 56, in some embodiments the initiator portion, or one or more features thereof, can be implemented as a feature of the airbag controller 56.

The airbag 54 is configured to be inflated only once. That is, after the airbag 54 has been inflated and the gas within the airbag 54 has gradually been discharged through the at least one vent in the bag portion 68 of the airbag 54, the airbag 54 will return to its deflated state (see FIGS. 2 and 4) and will be inoperable for further use (e.g., inoperable for re-inflation). The used airbag 54 can be replaced with a new, unused airbag 54 during maintenance of the gas turbine engine 12.

In some embodiments, the fluid supply system 10 includes a plurality of airbags 54 that can be individually and selectively inflated. In the embodiment illustrated in FIG. 4, for example, the fluid supply system 10 includes a first airbag 54a and a second airbag 54b. If the first airbag 54a has been used (e.g., inflated and then returned to its deflated state) in response to a first non-positive g-force event, and if the gas turbine engine 12 later experiences a second non-positive g-force event that occurs before the first airbag 54a has been replaced during maintenance, then the second airbag 54b can be inflated in response to the second non-positive g-force event to cause the moveable barrier 52 to move from the flow-permitting position (see FIGS. 2 and 4) to the flow-restricting position (see FIG. 3). Alternatively, if the first airbag 54a begins to deflate before the end of a non-positive g-force event, then the second airbag 54b can be inflated during the non-positive g-force event to further maintain a non-interrupted circulating flow of the turbomachine fluid to the at least one component (e.g., the geared architecture 42) of the gas turbine engine 12 during the non-positive g-force event.

The airbag controller 56 is operable to detect and process g-force information. The detected g-force information is indicative of g-forces experienced by the gas turbine engine 12, and/or at least one component thereof (e.g., the fluid supply system 10). The detected g-force information can include information relating to the magnitude of experienced g-forces, the sign (i.e., positive, negative, zero) of experienced g-forces, a time duration of a g-force event, and/or other information related to experienced g-forces. The airbag controller 56 is operable to process the detected g-force information to make a determination as to whether the airbag 54 should be inflated. The airbag controller 56 is operable to communicate (e.g., periodically communicate, continuously communicate) control signals to the initiator portion of the airbag 54 that is indicative of this determination, and that will cause the initiator portion of the airbag 54 to initiate the inflation material when necessary. In embodiments in which the fluid supply system 10 includes a plurality of airbags 54, such as the embodiment illustrated in FIG. 4, the airbag controller 56 is operable to communicate a control signal to each of the plurality of airbags 54. In such embodiments, the airbag controller 56 can be configured so that it will cause (e.g., via the controls signals communicated to the respective initiator portions of the plurality of airbags 54) only one airbag 54 to initiate within a predetermined time period, and so that it will cause only an unused airbag 54 to initiate.

The airbag controller 56 can be configured in various different ways. In some embodiments, the airbag controller 56 can be implemented using analog and/or digital hardware (e.g., counters, switches, logic devices, memory devices, programmable processors, non-transitory computer readable storage mediums), software, firmware, or a combination thereof. In some embodiments, airbag controller 56 can perform one or more of the functions described herein by executing software, which can be stored, for example, in a memory device included in the airbag controller 56. A person having ordinary skill in the art would be able to adapt (e.g., construct, program) the airbag controller 56 to perform the functionality described herein without undue experimentation.

Referring to FIGS. 1-4, a method for maintaining a non-interrupted circulating flow of the turbomachine fluid to the at least one component (e.g., the geared architecture 42) of the gas turbine engine 12 (see FIG. 1) during a non-positive g-force event involves the steps of: (1) providing a fluid supply system 10 that includes a fluid container 50, a moveable barrier 52 fluidly dividing the fluid container 50 into a first portion 58 and a second portion 60, and an airbag 54 positioned within the first portion 58 of the fluid container 50; (2) providing a circulating flow of the turbomachine fluid between the at least one component of the gas turbine engine 12 and the second portion 60 of fluid container 50; and (3) selectively inflating the airbag 54 to move the moveable barrier 52 from a flow-permitting position (see FIGS. 2 and 4) to a flow-restricting position (see FIG. 3) during the non-positive g-force event, wherein the circulating flow of the turbomachine fluid is at least partially impeded by the moveable barrier 52 when the moveable barrier 52 is in the flow-restricting position (see FIG. 3).

Previous fluid supply system designs have involved the use of pressurized fluid communicated to a fluid container via a "plumbing system." The "plumbing system" can be structurally complicated, and can add significant amount of weight to the gas turbine engine. The inclusion of the airbag 54 in the present fluid supply system 10 eliminates the need for pressurized fluid to be communicated to the fluid container 50, and thereby eliminates the need for a "plumbing system." The present fluid supply system 10 thus offers significant advantages over previous fluid supply system designs.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A fluid supply system for providing a turbomachine fluid to a component of a gas turbine engine, the fluid supply system comprising:
   a fluid container;
   a moveable barrier fluidly dividing the fluid container into a first portion and a second portion, wherein the moveable barrier is moveable between a flow-permitting position and a flow-restricting position, wherein the turbomachine fluid experiences a circulating flow between the component and the second portion of the fluid container when the moveable barrier is in the flow-permitting position, and wherein the circulating flow is at least partially impeded by the moveable barrier when the moveable barrier is in the flow-restricting position; and
   an airbag positioned within the first portion of the fluid container, wherein the airbag is selectively operable to move the moveable barrier from the flow-permitting position to the flow-restricting position.

2. The fluid supply system of claim 1, wherein the turbomachine fluid is a lubricant.

3. The fluid supply system of claim 1, wherein the component is at least a portion of a geared architecture of the gas turbine engine.

4. The fluid supply system of claim 1, wherein the circulating flow is stopped by the moveable barrier when the moveable barrier is in the flow-restricting position.

5. The fluid supply system of claim 1, wherein the moveable barrier is a piston-type barrier that includes a spring biases the moveable barrier toward the flow-permitting position.

6. The fluid supply system of claim 1, wherein movement of the moveable barrier from the flow-permitting position to the flow-restricting position during a non-positive g-force event, and thereby aids in maintaining a non-interrupted supply of the turbomachine fluid to the component.

7. The fluid supply system of claim 6, further comprising a pump operable to draw the turbomachine fluid from an outlet disposed relative to the second portion of the fluid container, and operable to deliver the turbomachine fluid to the component of the gas turbine engine; and
   wherein movement of the moveable barrier from the flow-permitting position to the flow-restricting position allows the pump to maintain positive suction at the outlet.

8. The fluid supply system of claim 1, wherein the airbag is selectively inflatable.

9. The fluid supply system of claim 1, wherein the airbag includes a bag portion, an inflation material disposed within the bag portion, and an initiator portion disposed relative to the inflation material; and
   wherein upon initiation by the initiator portion of the airbag, the inflation material rapidly generates a sufficient amount of gas to actuate the airbag from a deflated state to an inflated state.

10. The fluid supply system of claim 9, wherein the initiation includes catalysis of a chemical reaction involving the inflation material.

11. The fluid supply system of claim 1, wherein the airbag includes a bag portion, an inflation material disposed within the bag portion, and an initiator portion disposed relative to the inflation material.

12. The fluid supply system of claim 11, wherein the airbag is selectively actuatable from a deflated state to an inflated state;
wherein in the deflated state, a volume of the bag portion is smaller than a volume of the first portion of the fluid container when the moveable barrier is in the flow-permitting position; and
wherein in the inflated state, a volume of the bag portion is greater than a volume of the first portion of the fluid container when the moveable barrier is in the flow-permitting position.

13. The fluid supply system of claim 12, wherein when the airbag is selectively actuated from the deflated state to the inflated state, the bag portion imparts forces on the inner surface of the fluid container and the moveable barrier that cause the moveable barrier to move from the flow-permitting position to the flow-restricting position.

14. The fluid supply system of claim 11, wherein the initiator portion of the airbag is a pyrotechnic device that is operable to initiate the inflation material included in the airbag.

15. The fluid supply system of claim 11, wherein the initiator portion of the airbag is operable to initiate the inflation material included in the airbag in response to a control signal received from an airbag controller.

16. The fluid supply system of claim 15, wherein the airbag controller is operable to detect and process information indicative of g-forces experienced by the gas turbine engine, and operable to make a determination as to whether the airbag should be inflated.

17. The fluid supply system of claim 1, wherein the airbag is configured for one time use.

18. The fluid supply system of claim 1, wherein the airbag is a first airbag; and
wherein the fluid supply system further comprises a second airbag positioned within the first portion of the fluid container, wherein the second airbag is selectively operable to move the moveable barrier from the flow-permitting position to the flow-restricting position.

19. The fluid supply system of claim 18, wherein the fluid supply system further comprises an airbag controller that is operable to independently and selectively inflate each of the first airbag and the second airbag.

20. A method for maintaining a non-interrupted circulating flow of a turbomachine fluid to a component of a gas turbine engine during a non-positive g-force event, comprising:
providing a fluid supply system that includes a fluid container, a moveable barrier fluidly dividing the fluid container into a first portion and a second portion, and an airbag positioned within the first portion of the fluid container;
providing a circulating flow of the turbomachine fluid between the component of the gas turbine engine and the second portion of the fluid container; and
selectively inflating the airbag to move the moveable barrier from a flow-permitting position to a flow-restricting position during the non-positive g-force event, wherein the circulating flow of the turbomachine fluid is at least partially impeded by the moveable barrier when the moveable barrier is in the flow-restricting position.

* * * * *